United States Patent
Takamura

(10) Patent No.: US 11,014,471 B2
(45) Date of Patent: May 25, 2021

(54) VEHICLE

(71) Applicant: HONDA MOTOR CO., LTD., Tokyo (JP)

(72) Inventor: Yuki Takamura, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 116 days.

(21) Appl. No.: 16/454,754

(22) Filed: Jun. 27, 2019

(65) Prior Publication Data

US 2020/0039386 A1 Feb. 6, 2020

(30) Foreign Application Priority Data

Aug. 6, 2018 (JP) .............................. JP2018-147505

(51) Int. Cl.
 *B60N 2/02* (2006.01)
 *B60N 2/01* (2006.01)

(52) U.S. Cl.
 CPC ................. *B60N 2/02* (2013.01); *B60N 2/01* (2013.01); *B60N 2002/022* (2013.01)

(58) Field of Classification Search
 CPC ....... B60N 2/02; B60N 2/01; B60N 2002/022
 See application file for complete search history.

(56) References Cited

U.S. PATENT DOCUMENTS

| 2,272,743 A * | 2/1942 | Gay ....................... A47B 41/02 297/174 R |
| 2,556,724 A * | 6/1951 | Hubseh .................. B60N 3/004 297/173 |
| 3,488,089 A * | 1/1970 | Brennan ................ B60N 3/001 297/162 |
| 3,977,723 A * | 8/1976 | Jones ..................... A47B 83/02 297/173 |
| 4,318,471 A * | 3/1982 | Hutton .................. A47B 97/08 206/214 |
| D365,694 S * | 1/1996 | Liisberg ........................ D6/358 |
| 5,588,663 A * | 12/1996 | Rundle .................... A47C 7/70 108/44 |
| 5,588,697 A * | 12/1996 | Yoshida ................. A47B 13/16 108/160 |
| 5,890,765 A * | 4/1999 | LaPointe .............. A47C 1/0355 108/128 |
| 6,003,446 A * | 12/1999 | Leibowitz ........... A47B 23/002 108/43 |
| 6,173,656 B1 * | 1/2001 | Blanchard ........... A47B 23/002 108/43 |
| 6,598,934 B1 * | 7/2003 | Anderson ................ B60N 2/79 297/162 |

(Continued)

FOREIGN PATENT DOCUMENTS

JP 2017039400 A 2/2017

*Primary Examiner* — Lori L Lyjak
(74) *Attorney, Agent, or Firm* — Armstrong Teasdale LLP

(57) ABSTRACT

A vehicle provides a comfortable space for a wide range of passengers. The vehicle (1) includes a plurality of seats (31) arranged in a fore and aft direction in a cabin (5) of the vehicle, each seat being supported in the cabin so as to be rotatable around a vertically extending rotational axis. Preferably, at least one of the seats includes a support column (32) extending vertically from a floor (6) of the cabin, and a seat cushion (33) supported at an upper end of the support column so as to be rotatable around the vertically extending rotational axis.

7 Claims, 8 Drawing Sheets

(56) References Cited

U.S. PATENT DOCUMENTS

| | | | | |
|---|---|---|---|---|
| 6,702,373 B2* | 3/2004 | Rossko | A47C 7/68 297/170 |
| 6,807,902 B1* | 10/2004 | Ginter | B60N 3/002 100/44 |
| D547,957 S * | 8/2007 | Muller | D6/360 |
| 9,744,932 B1* | 8/2017 | Faruque | B60R 21/16 |
| 9,902,362 B2* | 2/2018 | Farooq | B60N 2/14 |
| 10,500,988 B1* | 12/2019 | Faruque | B60N 2/146 |
| 10,730,407 B2* | 8/2020 | Guy | B60N 2/0715 |
| 2002/0060481 A1* | 5/2002 | Jones | B60N 2/206 297/188.04 |
| 2002/0158492 A1* | 10/2002 | Ko | A47C 7/54 297/112 |
| 2003/0230220 A1* | 12/2003 | Evans | A47C 7/70 108/43 |
| 2006/0103180 A1* | 5/2006 | Brown | A47C 7/70 297/162 |
| 2007/0113757 A1* | 5/2007 | Lilly | A47G 23/0608 108/25 |
| 2007/0278834 A1* | 12/2007 | Kielland | A47B 23/04 297/170 |
| 2008/0084328 A1* | 4/2008 | Crichton | G08C 23/04 340/4.11 |
| 2010/0072334 A1* | 3/2010 | Le Gette | F16M 11/10 248/176.3 |
| 2013/0193174 A1* | 8/2013 | Ackeret | B60R 7/04 224/275 |
| 2014/0103691 A1* | 4/2014 | Boyd | A47C 7/5062 297/344.18 |
| 2014/0167469 A1* | 6/2014 | Haller | B60N 2/16 297/344.12 |
| 2015/0114270 A1* | 4/2015 | Tsuchida | A47B 83/02 108/44 |
| 2016/0083096 A1* | 3/2016 | Gagnon | B64D 11/06 108/20 |
| 2016/0332540 A1* | 11/2016 | Martin | B60N 2/06 |
| 2017/0144621 A1* | 5/2017 | Rao | B60R 21/01552 |
| 2019/0059596 A1* | 2/2019 | Wallace | A47C 7/029 |
| 2019/0126783 A1* | 5/2019 | Baccouche | B60N 2/0292 |
| 2020/0239112 A1* | 7/2020 | Farmer | A47C 13/00 |
| 2020/0354063 A1* | 11/2020 | Satterfield | B64D 11/0636 |

* cited by examiner

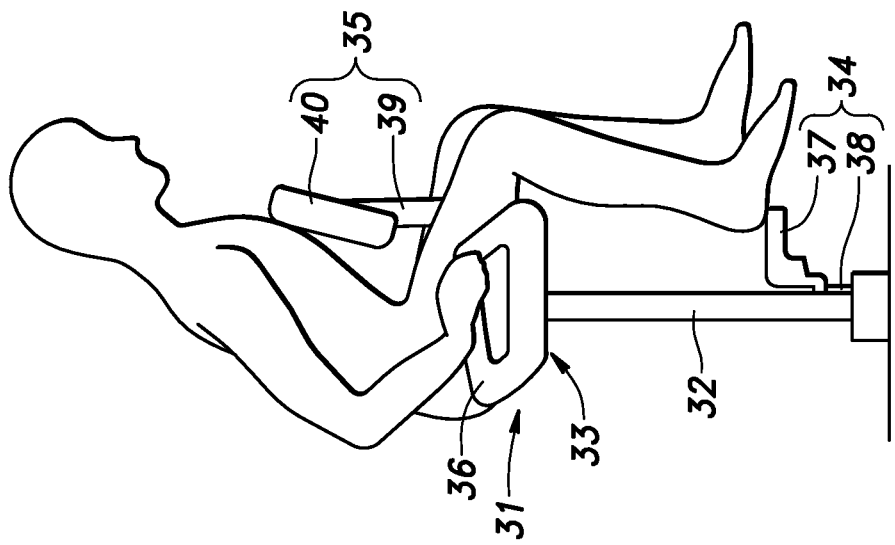
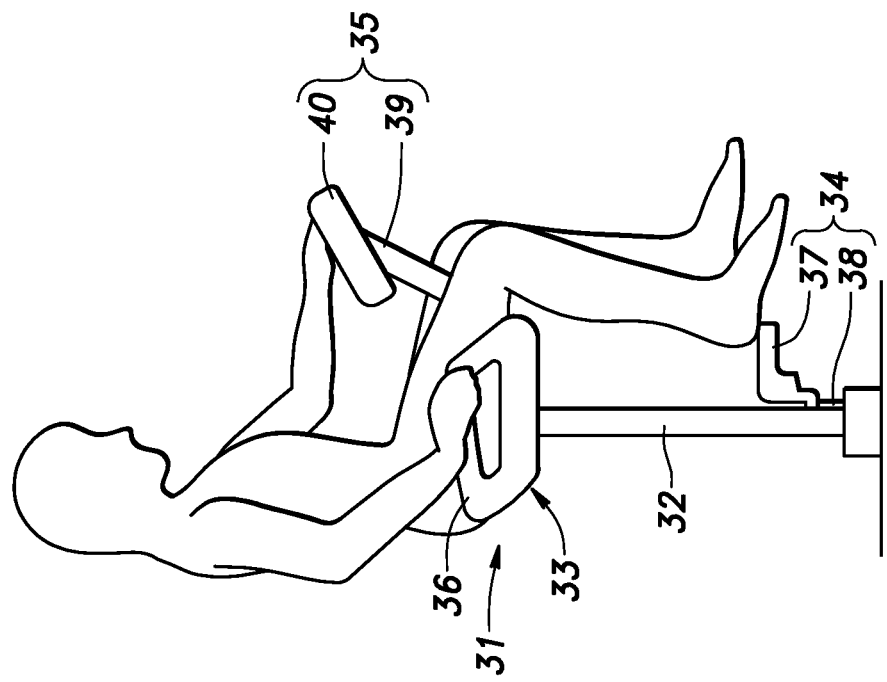

VEHICLE

TECHNICAL FIELD

The present invention relates to a vehicle, and in particular to a vehicle with a novel seat arrangement.

BACKGROUND ART

In an autonomous driving vehicle, the driver is not required to be facing forward at all times, and therefore, the front seat may be selectively turned rearward so as to face the rear seat. See JP2017-039400A, for instance. Thus, the introduction of autonomously driving vehicles has created new possibilities for seat arrangement.

Also, ride share is receiving a growing attention from the view point of reducing traffic congestion and $CO_2$ emission. In a ride share, groups of people sharing common destinations share common vehicles. Oftentimes, people sharing a ride may be strangers to one another. Therefore, some consideration may be desired in seating the people sharing the ride so as to maximize privacy and minimize stress. On the other hand, people sharing the ride may know one another. In such a case, it may be desired that the passengers are seated so as to facilitate mutual conversation.

SUMMARY OF THE INVENTION

In view of such a problem of the prior art, a primary object of the present invention is to provide a vehicle that can provide a comfortable space for a wide range of passengers.

To achieve such an object, one embodiment of the present invention provides a vehicle (1) comprising a plurality of seats (31) arranged in a fore and aft direction in a cabin (5) of the vehicle, each seat being supported in the cabin so as to be rotatable around a vertically extending rotational axis. Preferably, at least one of the seats includes a support column (32) extending vertically from a floor (6) of the cabin, and a seat cushion (33) supported at an upper end of the support column so as to be rotatable around the vertically extending rotational axis.

Thereby, each passenger can choose the direction in which the own seat faces so that the passenger can face outward to see the external view or face inward to chat with a fellow passenger, as desired. Thus, by allowing each passenger to choose the own seating arrangement, the riding comfort can be enhanced.

Preferably, the support column is configured to be selectively extended and retracted.

Thereby, the passenger is enabled to adjust the height of the seat cushion so as to suit the own stature or preference.

Preferably, the seat cushion is provided with a first hand grip (36) on a side part thereof.

Thereby, the passenger seating on the seat cushion can stabilize the own upper body by holding on the first hand grip.

Preferably, the support column is provided with a foot rest (34) configured to support a sole of a passenger seating on the corresponding seat cushion.

The foot rest allows the height of the seat cushion to be raised so that the passenger can enjoy the scenery from a high point. Also, by encouraging the passenger to place his or her legs on the foot rest, the floor space occupied by the passenger can be effectively reduced so that the riding comfort of the fellow passengers can be enhanced, and the available luggage space on the floor can be maximized.

Preferably, at least one of the seats is provided with an arm (39) having a base end pivotally attached to a part of the seat so that a free end of the arm can be selectively positioned in a use position located above and in front of the corresponding seat cushion and a stowed position located below a seat surface of the seat cushion, and a support member (40) attached to the free end of the arm.

The passenger seated in the seat cushion can stabilize the own upper body by holding on the support member.

Preferably, the support member is provided with a surface formed by soft material.

Thereby, the passenger can lean on the support member for improved riding comfort.

Preferably, the support member is provided with a second hand grip (41).

Thereby, the passenger seating on the seat cushion can stabilize the own upper body by holding on the first hand grip.

Preferably, the support member is provided with a retaining feature (43) for retaining a mobile terminal (42).

The passenger is thereby able to operate the mobile terminal in a comfortable manner.

Preferably, the seats are arranged in two rows extending in the fore and aft direction, the two rows being positioned laterally next to each other.

Thereby, a relatively large number of passengers can be accommodated in the cabin in a comfortable manner by taking the advantage of the rotatable seats.

Thus, according to the above configuration, there is provided a vehicle that can provide a comfortable space for a wide range of passengers.

BRIEF DESCRIPTION OF THE DRAWINGS

FIGS. 8A and 8B are side views illustrating the mode of operation of the seat shown in FIG. 7.

DESCRIPTION OF THE PREFERRED EMBODIMENT(S)

Preferred embodiments of the present invention are described in the following with reference to the appended drawings.

Figure 1:
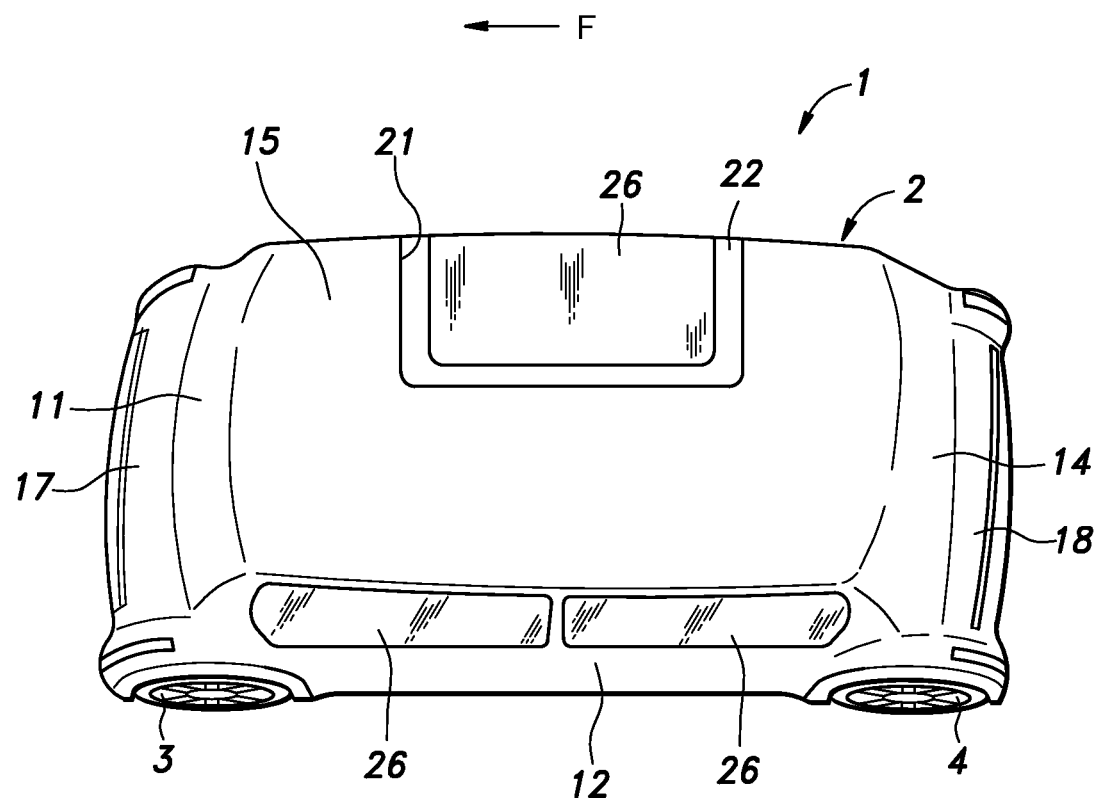
FIG. 1 is a perspective view of a vehicle according to a first embodiment of the present invention as viewed from an upper left direction.
Figure 2:
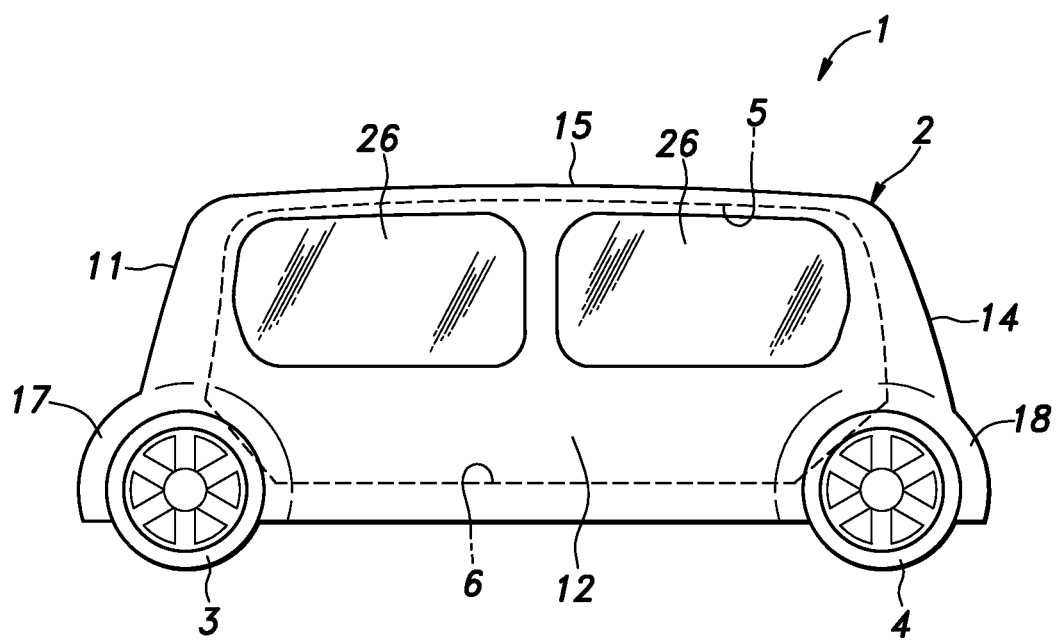
FIG. 2 is a left side view of the vehicle.
Figure 3:
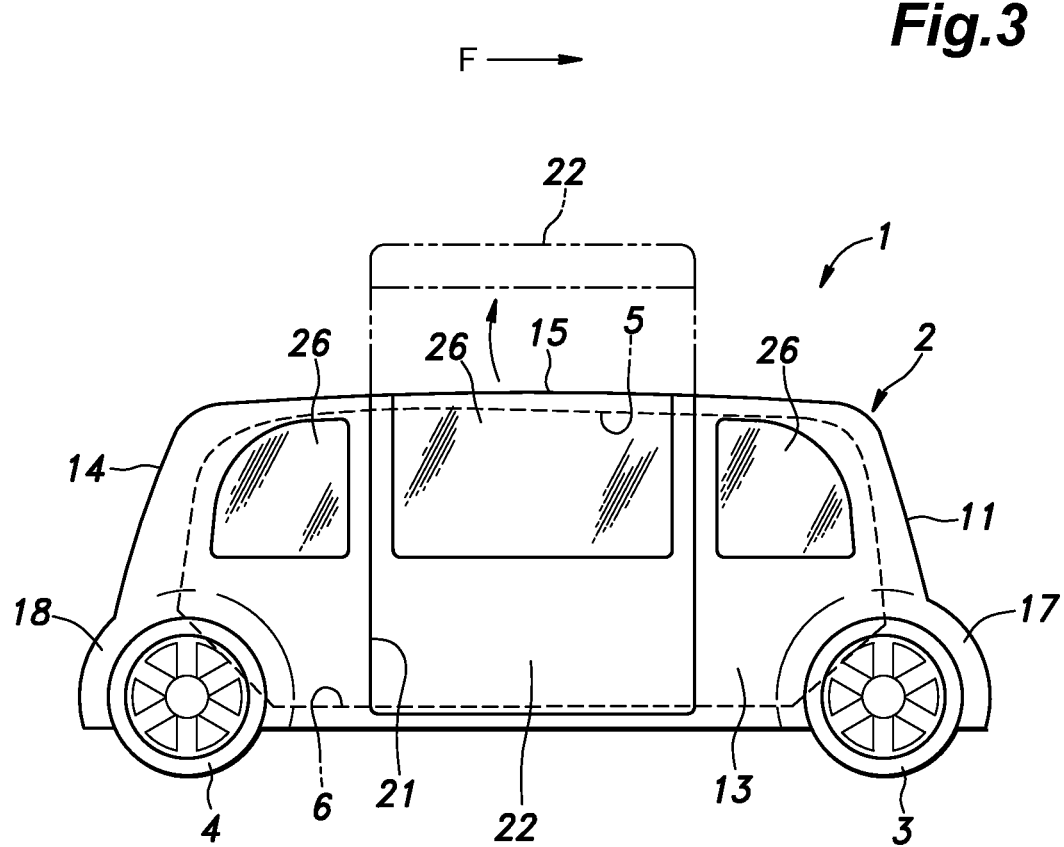
FIG. 3 is a right side view of the vehicle.

As shown in FIGS. 1 to 3, a vehicle 1 according to a first embodiment of the present invention consists of a four-wheeled vehicle. The vehicle 1 has a substantially rectangular vehicle body 2 elongated in the fore and aft direction. The vehicle body 2 is provided with a pair of front wheels 3 and a pair of rear wheels 4. The vehicle 1 may consist of an autonomous vehicle that does not require a driver.

As shown in FIGS. 1 to 4, a central part of the vehicle body 2 defines a substantially rectangular cabin 5 which is elongated in the fore and aft direction. The cabin 5 is defined by a floor 6, a front wall 11 extending laterally and vertically along a front edge of the floor 6, a left wall 12 extending rearward from the left edge of the front wall 11, a right wall 13 extending rearward from the right edge of the front wall 11, a rear wall 14 extending between the rear edges of the left wall 12 and the right wall 13, and a roof 15 connected to the upper edges of the front wall 11, the left wall 12, the right wall 13 and the rear wall 14.

A drive source such as an electric motor and an internal combustion engine, and a control unit such as an ECU are mounted either in a front part 17 of the vehicle body 2 located ahead of the front wall 11 or in a rear part 18 of the vehicle body 2 located behind the rear wall 14. The remaining available space in the vehicle front part 17 and the vehicle rear part 18 may be used as a luggage stowage space.

The right wall 13 is provided with a door opening 21 which is fitted with a door 22 for selectively closing the door opening 21. The door opening 21 extends from the lower end of the right wall 13 to a middle part of the roof 15. The door 22 in this embodiment consists of a gull-wing door, and is supported by the roof 15 at an upper end so as to be rotatable about a rotational axis extending in the fore and aft direction. Alternatively, the door 22 may consist of a regular swing door or a slide door. Windows 26 each fitted with a glass pane are provided in the remaining parts of the right wall 13 located ahead of and behind the door 22, in an upper part of the door 22, and in a large part of the left wall 12. For example, the vehicle 1 can be used as a means of transportation in a shopping mall, between terminals of an airport, or between a terminal and an airplane at an airport.

Figure 4:
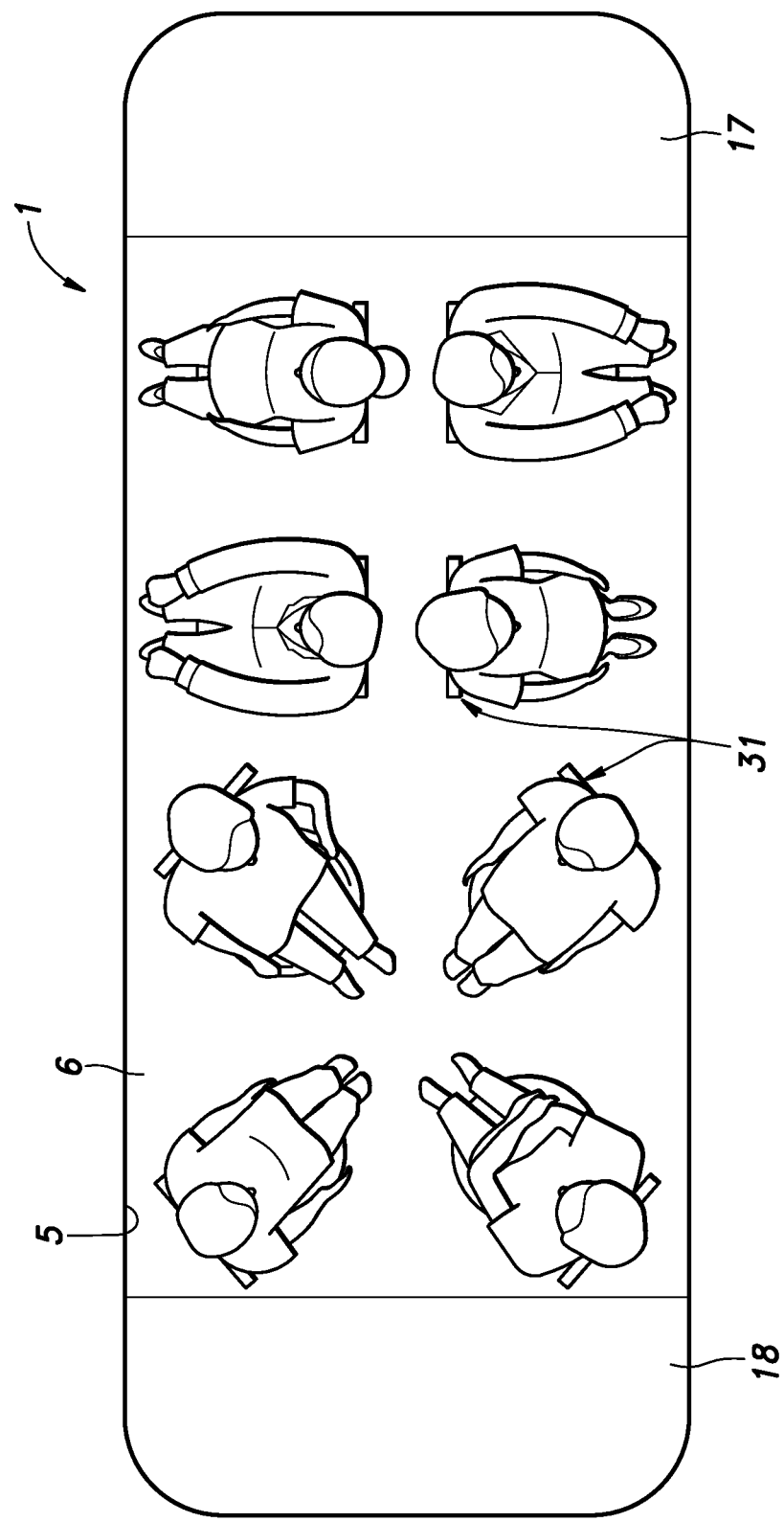
FIG. 4 is a see-through plan view of a cabin of the vehicle with passengers seating on seats in the cabin.
Figure 5:
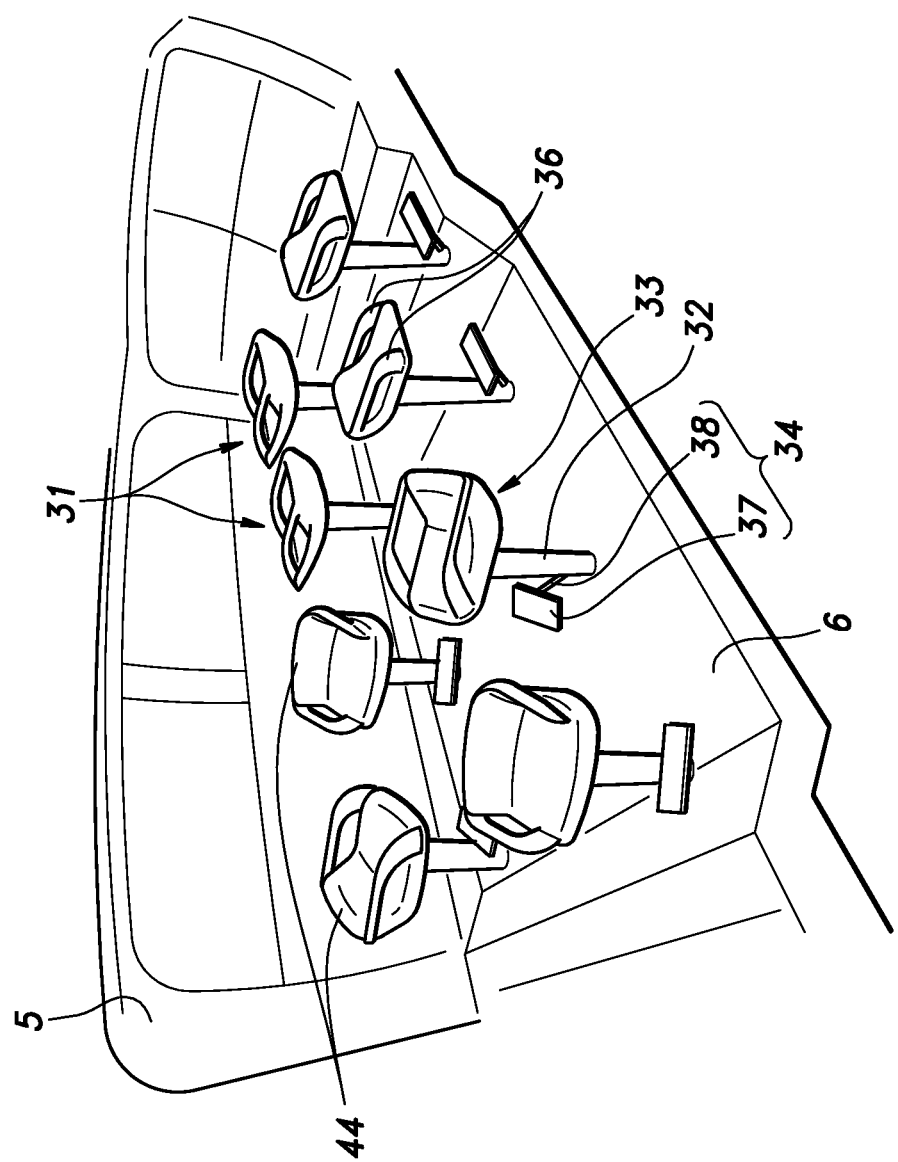
FIG. 5 is a see-through perspective view of the cabin as viewed from an upper left front direction.

As shown in FIG. 4, two rows of seats 31 extending in the fore and aft direction are arranged laterally one next to the other in the cabin 5, and each row including four seats 31 that can face in any desired direction as will be discussed hereinafter. As shown in FIG. 5, each seat 31 includes a support column 32 having a lower end secured to the floor 6 and extending vertically, a seat cushion 33 supported at the upper end of the support column 32, and a foot rest 34 supported by a lower part of the support column 32. In this embodiment, the seats 31 are each provided with a low seat back 44 which integrally extends obliquely upward from the rear edge of the seat cushion 33. In an alternate embodiment, the seat cushion 33 may be provided with a seat back which is connected to the seat cushion via a per se known reclining mechanism not shown in the drawings.

Figure 6:
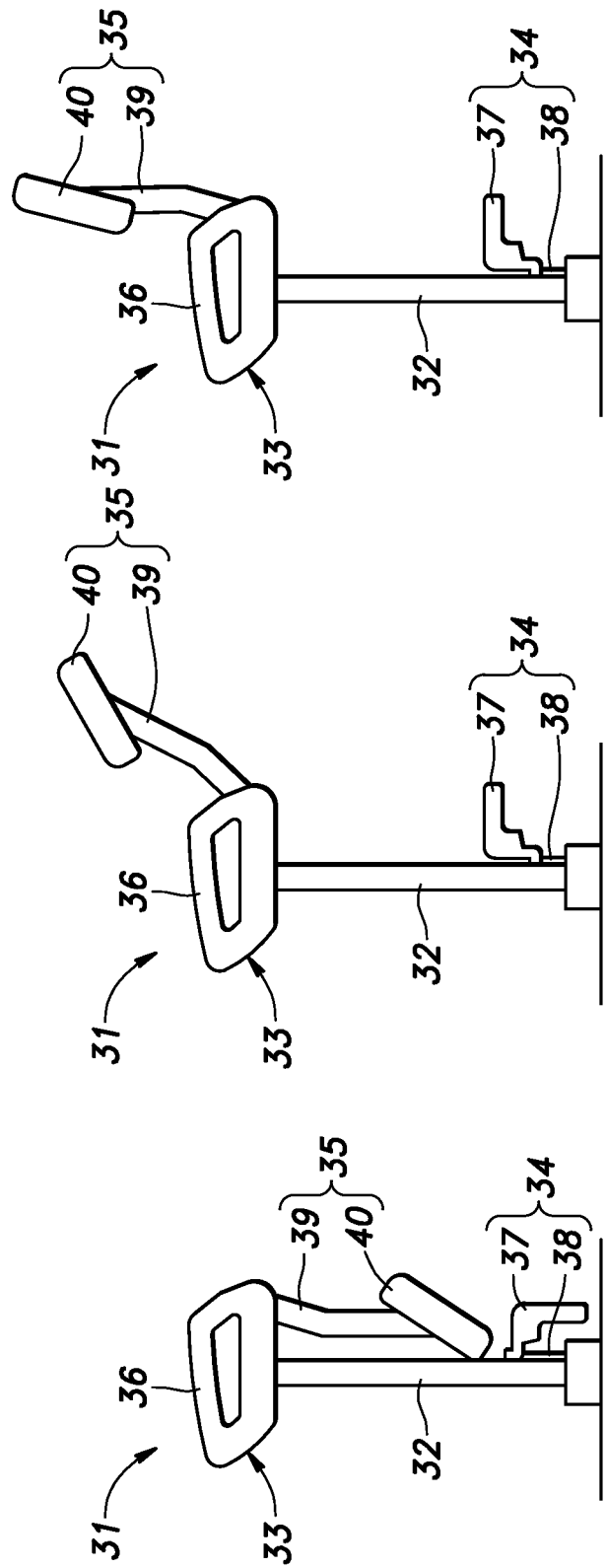
FIGS. 6A to 6C are side views of a seat according to a second embodiment of the present invention, showing a support device placed in different positions in relation to a seat cushion of the seat.

As shown in FIG. 6, the support column 32 can be vertically extended and contracted by air pressure or the like. In this embodiment, the support column 32 is fixedly attached to the seat cushion 33 at the upper end thereof, and rotatably supported by the floor 6 at the lower end thereof so that the seat cushion 33 and the foot rest 34 can rotate around a vertical rotational axis. Preferably, the angular position of the seat cushion 33 and the associate parts can be selectively fixed at a desired angular position around the vertical rotational axis by using a per se known lock mechanism not shown in the drawings. Each foot rest 34 may be configured to be retractable. Since the seat cushion 33 is rotatable about the vertical rotational axis, the passenger seated on the seat cushion 33 can face in any desired direction or 360 degrees in the horizontal direction.

Each seat cushion 33 is provided with a pair of first grips 36 on either side edge of the seat cushion 33. In the present embodiment, each first grip 36 is in the form of a bar that extends from a front part of the seat cushion 33 to an upper part of the seat back 44. In particular, each first grip 36 is positioned so as to be higher than the seating surface. In this embodiment, the seating surface of the seat cushion 33 is higher than the knee of a standing passenger, or this seat 31 may be referred to as a high chair.

The foot rest 34 includes a main body 37 consisting of a plate member configured to support the feet (sole) of the occupant, and a connecting portion 38 for connecting the main body 37 to the support column 32. The main body 37 is fixedly attached to the free end of the connecting portion 38, and the base end of the connecting portion 38 is attached to the support column 32 so as to be selectively positioned between a use position in which the main body 37 is fully extended, and a collapsed position where the connecting portion 38 along with the main body 37 is collapsed against the support column 32.

Figure 7:
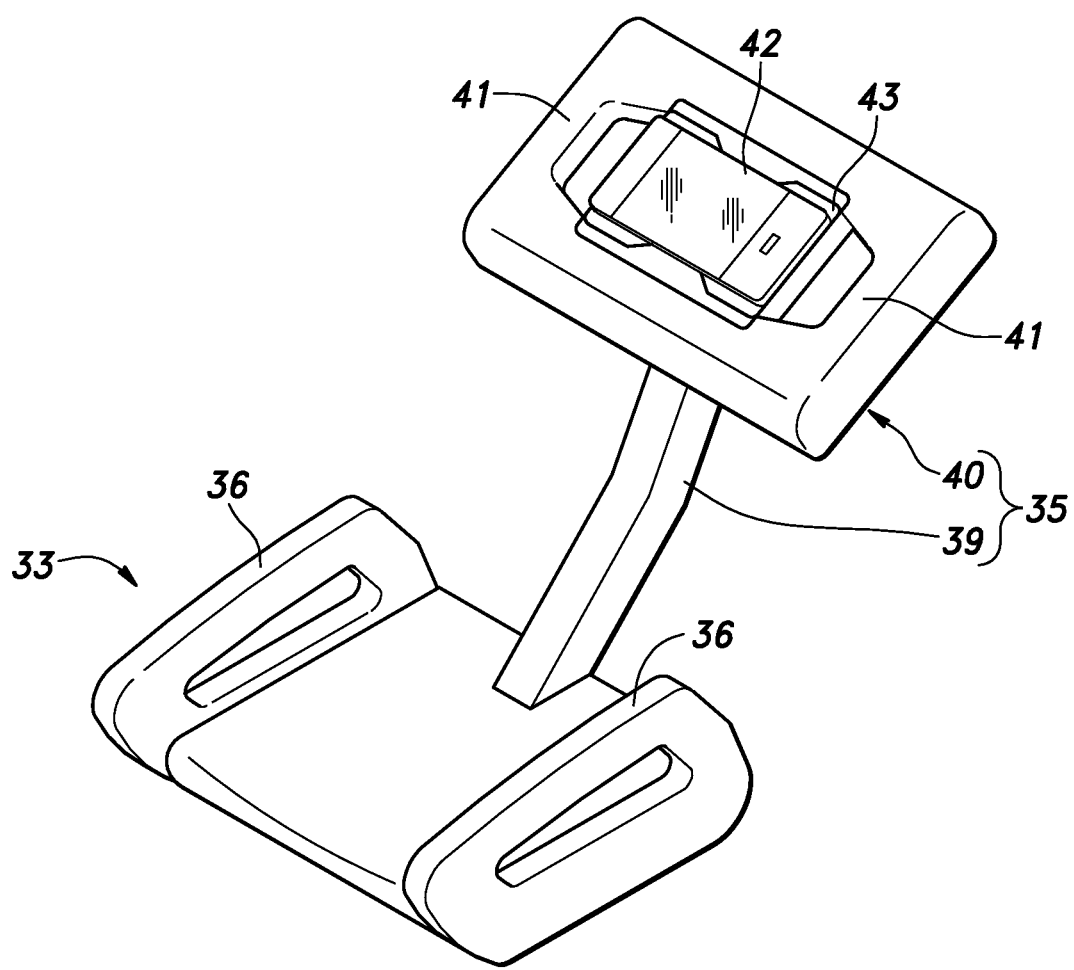
FIG. 7 is an enlarged perspective view of the seat cushion and the associated support device.

FIGS. 6 to 8 show a second embodiment of the present invention which differs from the first embodiment in being provided with a support device 35 and not being provided with a seat back, but is otherwise similar to the first embodiment. As best shown in FIGS. 6 and 7, the support device 35 includes an arm 39 having a base end pivotally connected to a laterally central, front part of the seat cushion 33, and a support member 40 pivotally connected to the free end of the arm 39. The base end of the arm 39 is attached to the seat cushion 33 so as to be rotatable around a rotational axis extending laterally along the front edge of the seat cushion 33. The support member 40 is attached to the arm 39 so as to be rotatable in all directions via a spherical joint. Alternatively, the support member 40 may be rotatable only around two rotational center lines which are orthogonal to each other, not exclusively, so as to be tiltable both in the lateral and vertical directions. If desired, the base end of the arm 39 may be attached to a laterally side part of the front edge of the seat cushion 33 or, if desired, to one of the first grips 36.

FIGS. 6A to 6C show the possible movement of the arm 39. FIG. 6A shows a retracted position of the arm 39 in which the arm 39 extends closely next to the support column 32. FIG. 6B shows a first use position in which the arm 39 is placed in front of and above the seat cushion 33. FIG. 6C shows a second use position in which the arm 39 is tilted slightly more rearward or more upright than in the first use position. The arm 39 may be selectively fixed at any one of a plurality of positions including these three positions.

As best shown in FIG. 7, the support member 40 of the support device 35 is provided with a substantially flat and rectangular shape, and is supported by the free end of the arm 39 at the center on the back side thereof so as to be pivotable about the horizontal direction and the vertical direction. The support member 40 and/or the arm 39 may be rounded in the corner parts thereof, and suitably made of soft material or padded for the comfort of the user. In an alternate embodiment, the free end of the arm 39 is pivotally connected to a laterally side part of the support member 40. The left and right sides of the support member 40 are provided with second grips 41, respectively, for the convenience of the occupant. Each second grip 41 may consist of a rod member extending from an upper side part to a lower side part of the support member 40, or may be formed by recessing or forming a through hole in a part of the support member 40 adjacent to the corresponding lateral side edge thereof. The second grips 41 may be configured so as to serve as side supports for the occupant. The central part of the front surface of the support member 40 is recessed compared to the outer peripheral part thereof, and is provided with an engagement portion 43 (retaining feature) by which a mobile terminal 42 such as a smartphone can be detachable secured or retained to the support member 40 so that the occupant can use the mobile terminal 42 by tilting the support member 40 to an appropriate angle for comfortable viewing and easy operation without being required to hold it by hand. The engagement portion 43 may include a clamp that clamps the mobile terminal 42 by spring force or the like from two sides either vertically or laterally.

As shown in FIG. 6A, when the arm 39 is retracted or collapsed against the support column 32, the support device 35 is stowed away so that the space around the seat 31 can be maximized. The space around the seat 31 can be maximized even further when the foot rest 34 is also retracted. As shown in FIGS. 6B and 8A, when the arm 39 is placed in the first use position and the support member 40 is substantially horizontal, the support member 40 may be used as a table for the occupant, and may additionally allow the second grips 41 to be held by the occupant as hand rails to stabilize the posture of the occupant. As shown in FIGS. 6B and 8C, when the arm 39 is placed in the second use position and the support member 40 is substantially upright, the support member 40 may be used a support for the chest of the occupant. The user can thus lean against the support member 40 while seated on the seat cushion 33. In such a case, at least the front face of the support member 40 is padded or is otherwise made of soft material.

Since the seat cushion 33 is supported by the support column 32 so as to be rotatable about the vertical rotational axis, the occupant can sit on the seat cushion 33 facing any desired horizontal direction. For example, when riding alone, the occupant can face outward from the vehicle body 2 while seating on the seat 31. When riding with a friend, the two people can sit on the seat cushion 33 facing each other so as to chat with each other comfortably. More than two people may sit facing one another if desired.

Since the occupant place the soles of the occupant on the foot rest 34, the occupant occupies a minimum amount of floor space in the cabin 5 as opposed to the case where the legs of the occupant occupy a relatively large floor space in front of the occupant so that the cabin 5 may appear spacious to the occupant, and an extra luggage space may be created.

The occupant can keep his or her upper body stable by gripping the first grips 36 and/or the second grips 41. In addition, by leaned against the support member 40, the occupant can keep his or her upper body stable in an effortless manner. In addition, the support member 40 includes the engagement portion 43 so that the mobile terminal 42 can be kept secure and stable even when the occupant grips on the first grips 36 and/or the second grip 41 instead of holding the mobile terminal 42 by hand.

Since the height of each seat cushion 33 can be adjusted by the extension and contraction of the support column 32, the occupant can set the height of the seat cushion 33 as desired. In addition, since the seating surface of the seat cushion 33 is relatively high up from the floor 6, the occupant seated on the seat cushion 33 can have a good view.

When the seat 31 is not occupied with the foot rest 34 and the support device 35 retracted or in storage position, the floor space occupied by the unused seat 31 can be minimized so that the space available to other passengers can be maximized, and may even allow the passengers to freely walk about in the cabin 5. In particular, the comfort of the passengers can be maximized by eliminating the impression of being confined in a small space.

The present invention has been described in terms of specific embodiments thereof, but is not limited by such embodiments, and can be modified in various ways without departing from the spirit of the present invention. For instance, the vehicle 1 may not be an autonomous vehicle. In such a case, a driver's seat may be provided at the front, or the vehicle may be used a trailer that can be hitched to a tractor or any other pulling vehicle. Also, the arm 39 of the support device 35 may be attached to the support column 32 or one of the first grips 36, instead of the seat cushion 33. The foot rest 34 may be adjustable in regard to the height thereof, and the projecting length from the support column 32. The number of seats 31 is not limited by the examples in the foregoing embodiments, but can be freely selected depending on the size and the shape of the cabin 5, and the arrangement of the seat 31 can be selected freely.

The invention claimed is:

1. A vehicle comprising a plurality of seats arranged in a fore and aft direction in a cabin of the vehicle, each seat being supported in the cabin so as to be rotatable around a vertically extending rotational axis,
   wherein at least one of the seats includes a support column extending vertically from a floor of the cabin, and a seat cushion supported at an upper end of the support column so as to be rotatable around the vertically extending rotational axis,
   the support column is provided with a foot rest configured to support a sole of a passenger seating on the corresponding seat cushion and to be located in a direction corresponding to a front of the seat cushion with respect to the support column, and
   at least one of the seats is provided with an arm having a base end pivotally attached to a part of the seat so that a free end of the arm can be selectively positioned in a use position located above and in front of the corresponding seat cushion and a stowed position located below a seat surface of the seat cushion, and a support member attached to the free end of the arm so as to be rotatable around a rotational axis extending laterally.

2. The vehicle according to claim 1, wherein the support column is configured to be selectively extended and retracted.

3. The vehicle according to claim 1, wherein the seat cushion is provided with a first hand grip on a side part thereof.

4. The vehicle according to claim 1, wherein the support member is provided with a surface formed by soft material.

5. The vehicle according to claim 1, wherein the support member is provided with a second hand grip.

6. The vehicle according to claim 1, wherein the support member is provided with a retaining feature for retaining a mobile terminal.

7. The vehicle according to claim 1, wherein the seats are arranged in two rows extending in the fore and aft direction, the two rows being positioned laterally next to each other.

* * * * *